(12) United States Patent
Fukami et al.

(10) Patent No.: US 7,819,211 B2
(45) Date of Patent: Oct. 26, 2010

(54) MOTORCYCLE

(75) Inventors: Yoji Fukami, Kakogawa (JP); Takeshi Nakajima, Ashiya (JP)

(73) Assignee: Kawasaki Jukogyo Kabushiki Kaisha, Kobe-shi (JP)

( * ) Notice: Subject to any disclaimer, the term of this patent is extended or adjusted under 35 U.S.C. 154(b) by 730 days.

(21) Appl. No.: 11/726,720

(22) Filed: Mar. 21, 2007

(65) Prior Publication Data

US 2007/0235235 A1    Oct. 11, 2007

(30) Foreign Application Priority Data

Mar. 31, 2006    (JP)    ............... 2006-099542

(51) Int. Cl.
*B60K 6/26*    (2007.10)
(52) U.S. Cl. ............ 180/65.26; 180/220; 180/291
(58) Field of Classification Search ........ 180/291, 180/220, 65.26, 65.29; 903/907
See application file for complete search history.

(56) References Cited

U.S. PATENT DOCUMENTS

| | | | | | |
|---|---|---|---|---|---|
| 4,204,585 | A | * | 5/1980 | Tsuboi et al. ............... | 180/219 |
| 4,313,080 | A | * | 1/1982 | Park ............................. | 320/123 |
| 4,412,597 | A | * | 11/1983 | Aiba ........................... | 180/228 |
| 4,492,912 | A | * | 1/1985 | Nowakowski ............... | 320/123 |
| 6,155,366 | A | * | 12/2000 | Lin ........................... | 180/65.25 |
| 6,281,646 | B1 | * | 8/2001 | Masberg et al. ............. | 318/139 |
| 6,828,742 | B2 | * | 12/2004 | Suzuki et al. ............... | 318/139 |
| 2005/0211481 | A1 | * | 9/2005 | Sasamoto ................... | 180/65.2 |
| 2006/0063638 | A1 | * | 3/2006 | Vitale et al. ................... | 477/5 |

FOREIGN PATENT DOCUMENTS

JP    HEI 06-064451    3/1994

* cited by examiner

*Primary Examiner*—Frank B Vanaman
(74) *Attorney, Agent, or Firm*—Alleman Hall McCoy Russell & Tuttle LLP

(57) ABSTRACT

A motorcycle in which an engine is disposed between a front wheel and a rear wheel and an exhaust pipe for guiding exhaust gas emitted from the engine is extended forward relative to the engine, including an electric motor that is disposed behind a cylinder portion of the engine and is configured to apply a torque to a power transmission system including a crankshaft of the engine.

10 Claims, 4 Drawing Sheets

MOTORCYCLE

TECHNICAL FIELD

The present invention relates to a hybrid motorcycle that is equipped with an engine mounted between a front wheel and a rear wheel and an electric motor configured to propel the motorcycle, and includes an exhaust pipe that is coupled to the engine and is extended forward relative to the engine.

BACKGROUND OF THE INVENTION

In recent years, hybrid motor vehicles configured to travel by using a driving force generated by an electric motor in addition to an engine power have been developed (see Japanese Laid-Open Patent Application Publication No. 6-64451). Such hybrid vehicles have been commonly applied to four-wheeled motor vehicles and are now expected to be applied to two-wheeled motor vehicles.

When an electric motor is incorporated into a motorcycle, it is desirable to dispose the electric motor in a location where the electric motor is less susceptible to disturbances in the environment for the purpose of stable operation, because the electric motor operates on electric power. Furthermore, it is necessary to mount the electric motor efficiently in a limited space of the motorcycle so as not to increase the size of a vehicle body of the motorcycle.

SUMMARY OF THE INVENTION

The present invention addresses the above described conditions, and an object of the present invention is to provide a hybrid motorcycle configured to be driven by an engine and an electric motor suitably disposed therein.

According to the present invention, there is provided a motorcycle in which an engine is disposed between a front wheel and a rear wheel and an exhaust pipe for guiding exhaust gas emitted from the engine is extended forward relative to the engine, the motorcycle comprising an electric motor that is disposed behind a cylinder portion of the engine and is configured to apply torque to a power transmission system including a crankshaft of the engine.

In such a construction, the exhaust pipe, elevated in temperature because of high-temperature exhaust gas emitted from the engine and flowing therein, is extended forward relative to the engine, whereas the electric motor is disposed behind the cylinder portion of the engine on the opposite side of the exhaust pipe. Therefore, the electric motor is less susceptible to heat radiation from the exhaust pipe. As a result, the electric motor can operate stably.

The engine may include a cylinder block forming the cylinder portion and a crankcase disposed at a lower portion of the cylinder block. The exhaust pipe may be extended rearward from a region forward of the cylinder block through a region below the crankcase. The electric motor may be disposed in a space formed behind the cylinder block and above the crankcase.

In such a construction, since the electric motor is disposed in the space behind the cylinder block and above the crankcase, the size of the vehicle body is not substantially increased. In addition, since the exhaust pipe elevated in temperature is extended through the region below the crankcase whereas the electric motor is disposed above the crankcase, the electric motor is less susceptible to heat radiation from the exhaust pipe. As a result, the electric motor can operate more stably.

The electric motor and the crankshaft may be coupled to each other laterally of the crankcase via a chain and sprocket mechanism.

A frame member may be extended rearward from a head pipe for supporting the front wheel, a swing arm extending substantially forward and rearward may be pivoted at a front portion thereof to the frame member, and the rear wheel is rotatably mounted to a rear portion of the swing arm. The electric motor may be disposed forward relative to the connecting point where the swing arm and the frame member are coupled to each other.

In such a construction, since the electric motor is disposed between the connecting point where the front portion of the swing arm is coupled to the frame member and the cylinder portion of the engine so that the heavy weight of the electric motor is positioned near the center of gravity of the motorcycle. Therefore, weight of the motorcycle is well-balanced.

The motorcycle may further comprise a starter motor configured to apply a torque to the crankshaft to start the engine, a first electric power supplying unit configured to supply an electric power to the starter motor, and a second electric power supplying unit configured to supply the electric power to the electric motor and to have a voltage higher than a voltage of the first electric power supplying unit. The first electric power supplying unit may be configured to be able to be charged with the electric power supplied from the second electric power supplying unit.

In such a construction, since the first electric power supplying unit configured to supply the electric power to the starter motor is charged with the electric power supplied from the second electric power supplying unit configured to supply the electric power to the electric motor, there is no need for an electric generator for charging the first electric power supplying unit. As a result, the size of the vehicle body is not substantially increased.

The above and further objects and features of the invention will more fully be apparent from the following detailed description with accompanying drawings.

DETAILED DESCRIPTION OF THE PREFERRED EMBODIMENTS

Hereinafter, an embodiment of a motorcycle according to the present invention will be described with reference to the drawings. In this embodiment described below, the directions are referenced from the perspective of a rider (not shown) mounting the motorcycle.

Figure 1:
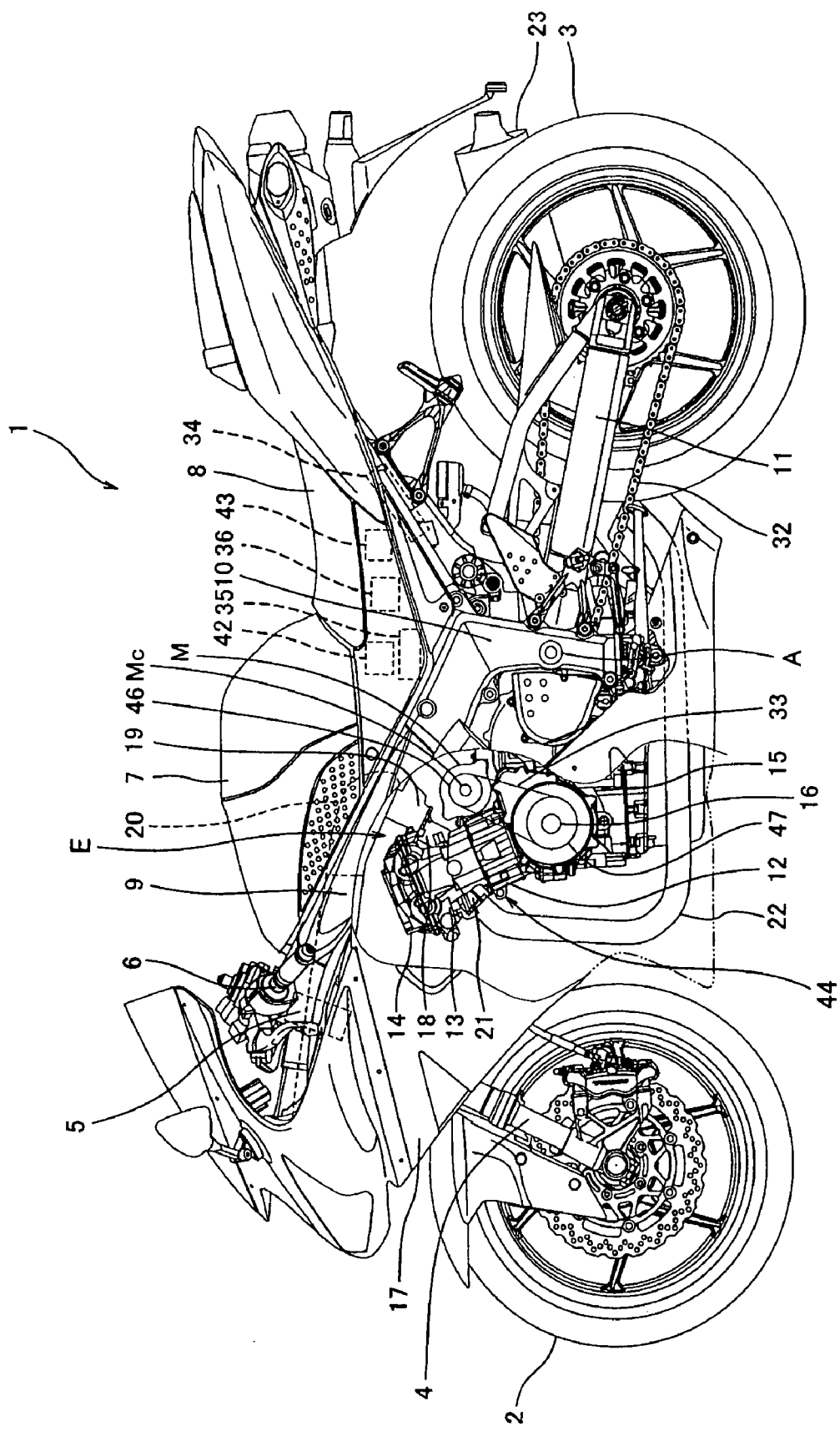
FIG. 1 is a left side view of a motorcycle according to an embodiment of the present invention.

FIG. 1 is a left side view of a motorcycle 1 according to an embodiment of the present invention. As shown in FIG. 1, the motorcycle 1 includes a front wheel 2 and a rear wheel 3. The front wheel 2 is rotatably mounted to a lower end portion of a front fork 4 extending substantially vertically. The front fork 4 is mounted on a steering shaft (not shown) by an upper bracket (not shown) attached to an upper end portion thereof, and an under bracket located below the upper bracket. The steering shaft is rotatably supported by a head pipe 5 externally attached to the steering shaft. A bar-type steering handle 6 extending rightward and leftward is attached to the upper bracket. When the rider rotates the steering handle 6 clockwise or counterclockwise, the front wheel 2 is turned to a desired direction with the steering shaft. A fuel tank 7 is disposed behind the steering handle 4. A straddle-type seat 8 is disposed behind the fuel tank 7.

A pair of right and left main frame members 9 (only left main frame member 9 is illustrated in FIG. 1) forming a frame of a vehicle body extend to be tilted slightly downward and rearward from the head pipe 5. A pair of right and left pivot frame members (left pivot frame member is illustrated in FIG. 1) 10 are coupled to rear portions of the main frame members 9. A swing arm 11 extending substantially forward and rearward is pivotally mounted at a front end portion thereof to each pivot frame member 10. The rear wheel 3 which is a drive wheel is rotatably mounted to a rear end portion of the swing arm 11. An engine E is mounted on the right and left main frame members 9 and the pivot frame members 10 in such a manner that the engine E is disposed below the main frame members 9 and forward of the pivot frame members 10. A cowling 17 extends from a front portion to side portions of the vehicle body to cover the engine E and other components.

The engine E is an in-line four-cylinder engine. The engine E includes a cylinder block 44 that extends substantially vertically and has four cylinder portions aligned rightward and leftward, and a crankcase 15 that extends substantially horizontally rearward from a lower portion of the cylinder block 44 and accommodates the crankshaft 16 therein. In the engine E, the cylinder block 44, which is tilted slightly forward, and the crankcase 15 form a substantially L-shape in a side view. The cylinder block 44 includes a cylinder block body 12 for slidably accommodating a piston 24 therein, a cylinder head 13 that is coupled to an upper portion of the cylinder block body 12, forms a combustion chamber with the cylinder block body 12, and accommodates a DOHC valve system, and a cylinder head cover 14 covering an upper portion of the cylinder head 13 from above.

An electric motor M for propelling the motorcycle 1 is disposed in a space formed behind the cylinder block 12 and above the crankcase 15 in a location forward of a connecting point A where the swing arm 11 and the pivot frame member 10 are coupled to each other. A first sprocket 46 is mounted on a left end portion of an output shaft Mc of the electric motor M. A second sprocket 47 is mounted on a left end portion of the crankshaft 16. An inverted tooth chain referred to as a silent chain 33 is wound around the first sprocket 46 and the second sprocket 47 to transmit a rotational force from the electric motor M to the crankshaft 16.

An intake port 18 opens in a rear portion of the cylinder head 13 of the engine E. A throttle device 19 is disposed inside the main frame members 9 and is coupled to the intake port 18. The electric motor M is positioned below a connecting point where the intake port 18 and the throttle device 19 are coupled to each other. An air cleaner box 20 is disposed below the fuel tank 7 and is coupled to an upstream portion of the throttle device 19 in an intake-air flow direction. The air cleaner box 20 takes in the air from outside by utilizing wind blowing from forward (ram pressure). An exhaust port 21 opens forward and downward at a front portion of the cylinder head 13. An upstream end of an exhaust pipe 22 is coupled to the exhaust port 21. The exhaust pipe 22 is extended forward from the exhaust port 21 of the engine E and then downward, and is further extended rearward through a region below the crankcase 15 of the engine E to a muffler 23 located behind. At desired locations below the seat 8, a large second electric power supplying unit 34, an inverter 35, a motor controller 36, a small first electric power supplying unit 42, and a DC/DC converter 43 are mounted.

Figure 2:
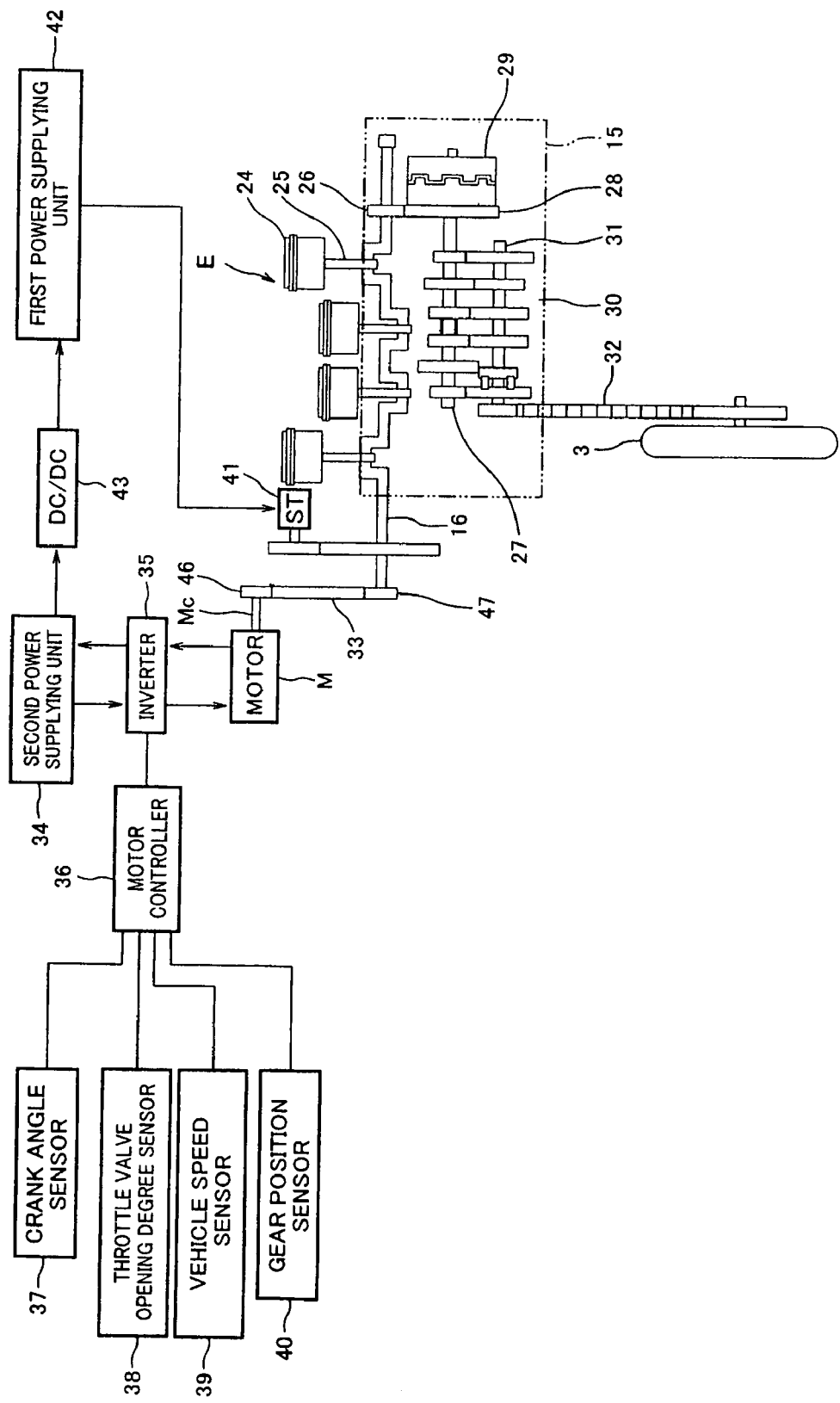
FIG. 2 is a block diagram of a power transmission system of the motorcycle of FIG. 1.

FIG. 2 is a block diagram of the motorcycle 1. As shown in FIG. 2, the crankcase 15 accommodates the crankshaft 16 coupled to connecting rods 25 of the pistons 24 of the engine E, and a first clutch gear 26 is mounted on the crankshaft 16. A second clutch gear 28 is rotatably externally fitted to a main shaft 27 and is enmeshed with the first clutch gear 26. In a state where a main clutch 29 fixedly mounted on an end portion of the main shaft 27 is engaged with the second clutch gear 28, the main shaft 27 is rotatable in association with the crankshaft 16. A counter shaft 31 is coupled to the main shaft 27 via a gear train 30 so that the counter shaft 31 can change its rotational speed. The counter shaft 31 is coupled to the rear wheel 3 via the chain 32. A path extending from the crankshaft 16 to the rear wheel 3 via the main shaft 27, the countershaft 31, and other components is a power transmission system.

Torque from the electric motor M is transmitted to the crankshaft 16 via the first sprocket 46, the silent chain 33, and the second sprocket 47. Electric power is supplied from the second electric power supplying unit (e.g., battery of 144 voltage) 34 to the electric motor M via the inverter 35. A motor controller 36 is coupled to the inverter 35. The motor controller 36 controls driving timing and the torque of the electric motor M.

A crank angle sensor 37 configured to detect a rotational angle of the crankshaft 16, a throttle valve opening degree sensor 38 configured to detect an opening degree of a throttle valve (not shown) disposed within the throttle device 19 (FIG. 1), a vehicle speed sensor 39 configured to detect a traveling speed of the motorcycle 1, a gear position sensor 40 configured to detect a gear position of the gear train 30 in the crankcase 15, are communicatively coupled to the motor controller 36.

Torque from a starter motor 41 of the engine E is transmitted to the crankshaft 16. The starter motor 41 is configured to have a power output that is smaller than a power output of the electric motor M. The starter motor 41 is configured to be driven upon the rider turning on a starter switch (not shown) at the start of the engine E. The starter motor 41 is supplied with electric power from the first electric power supplying unit 42 (e.g., battery of 14 voltage) for supplying the electric power to an electric system of the motorcycle. The first electric power supplying unit 42 is coupled to the second electric power supplying unit 34 through a DC/DC converter 43. When the electric motor M is used as an electric generator, the generated electric power can be supplied to the second electric power supplying unit 34 and the electric power accumulated in the second electric power supplying unit 34 is decreased in voltage in the DC/DC converter 43 and is supplied to the first electric power supplying unit 42.

Figure 3:
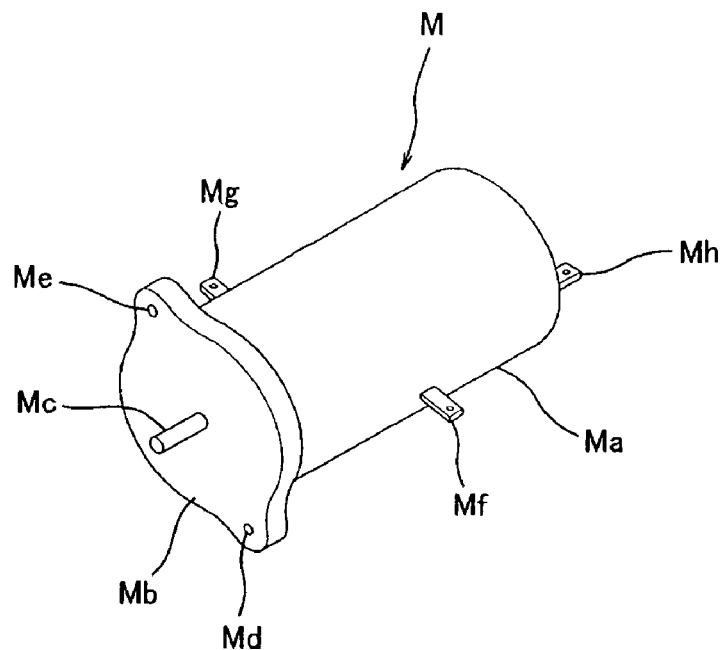
FIG. 3 is a perspective view of an electric motor mounted in the motorcycle of FIG. 1.

FIG. 3 is a perspective view of the electric motor M mounted in the motorcycle 1. As shown in FIG. 3, the electric motor M includes a cylindrical motor body Ma and a flange portion Mb provided at a left end portion of the motor body Ma. Bolt holes Md and Me are formed at desired locations on a periphery of the flange portion Mb. An output shaft Mc protrudes leftward from a center of the flange portion Mb. Plate-shaped mounting portions Mf and Mg having bolt holes protrude forward and backward from a peripheral surface of the motor body Ma. A plate-shaped mounting portion Mh having a bolt hole protrudes rightward from a right end surface of the motor body Ma.

Figure 4:
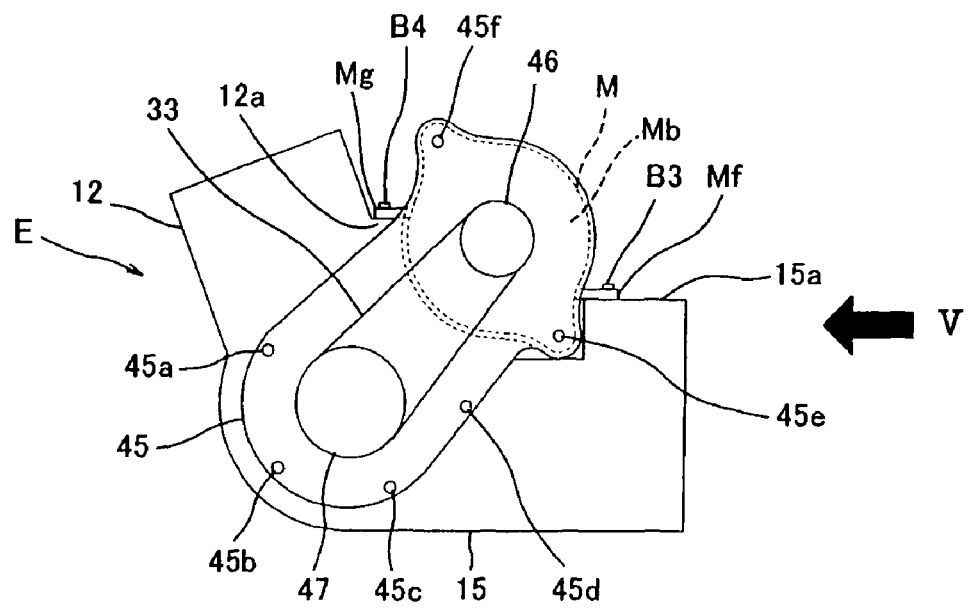
FIG. 4 is a side view schematically showing a state in which the electric motor is mounted to a vehicle body of the motorcycle of FIG. 1.
Figure 5:
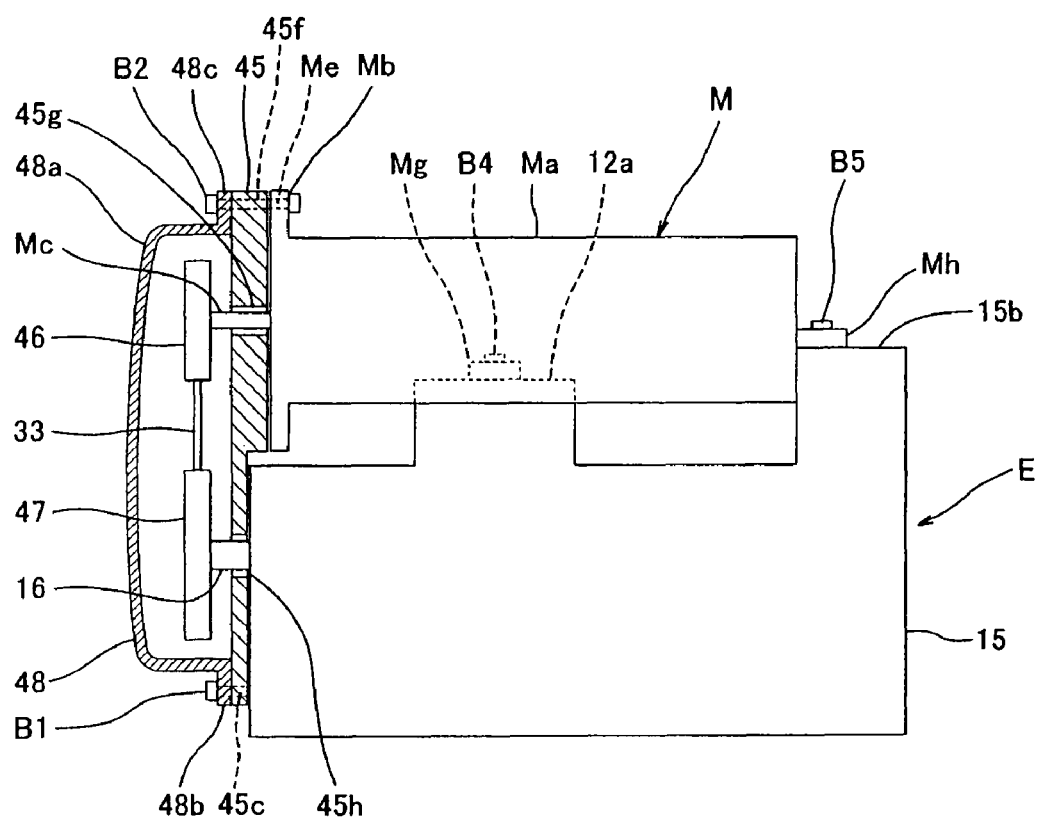
FIG. 5 is a rear view taken in the direction of an arrow V of FIG. 4.

FIG. 4 is a side view schematically showing a state in which the electric motor M is mounted to the vehicle body of the motorcycle 1. FIG. 5 is a rear view taken in the direction of an arrow V of FIG. 4. In FIG. 4, for easier understanding, a cover 48 shown in FIG. 5 is omitted. As shown in FIGS. 4 and 5, the electric motor M is disposed in a space formed behind the cylinder block body 12 and above the crankcase 15. A bracket 45, which is a metal plate, is mounted to a left side surface of the crankcase 15 of the engine E so as to protrude to a left end surface of the electric motor M. Bolt holes 45a to 45f are formed on the bracket 45 in locations corresponding to the left side surface of the crankcase 15 of the engine E and in locations corresponding to the bolt holes Md and Me of the electric motor M.

As shown in FIG. 5, a penetrating hole 45g into which the output shaft Mc of the electric motor M is inserted and a penetrating hole 45h into which the crankshaft 16 is inserted are formed on the bracket 45. The first sprocket 46 mounted on a left end portion of the output shaft Mc and the second sprocket 47 mounted on the left end portion of the crankshaft 16 are disposed on the left side of the bracket 45. The cover 48 in which the first sprocket 46, the second sprocket 47 and the silent chain 33 wound around the first sprocket 46 and the second sprocket 47 are accommodated is mounted on the left side surface of the bracket 45. The cover 48 includes an accommodating portion 48a having a concave cross-section, and flange portions 48b and 48c that protrude in flange shape from a peripheral edge of the accommodating portion 48a and having bolt holes (not shown).

As shown in FIGS. 4 and 5, bolts B1 are inserted into the bolt hole (not shown) of the flange portion 48b of the cover 48, the bolt holes 45a to 45d of the bracket 45, and the bolt holes (not shown) of the left side surface of the crankcase 15 of the engine E to fasten the cover 48, the bracket 45, and the engine E to each other. Bolts B2 are inserted into the bolt hole (not shown) of the flange portion 48c of the cover 48, the bolt holes 45e and 45f of he bracket 45, and the bolt holes Md and Me (FIG. 3) of the flange portion Mb of the electric motor M to fasten the cover 48, the bracket 45, and the electric motor M to each other.

As shown in FIG. 4, the rear mounting portion Mf of the electric motor M is placed on an upper surface 15a of a rear portion of the crankcase 15 of the engine E and is fastened to the upper surface 15a by a bolt B3. The front mounting portion Mg of the electric motor M is placed on an upper surface 12a formed on a back surface of the cylinder block body 12 of the engine E and is fastened to the upper surface 12a by a bolt B4. As shown in FIG. 5, the right mounting portion Mh of the electric motor M is placed on an upper surface 15b of a right portion of the crankcase 15 of the engine E and is fastened to the upper surface 15b by a bolt B5.

In the above construction, as shown in FIG. 1, the exhaust pipe 22, elevated in temperature because of exhaust gas emitted from the engine E and flowing therein, is extended from the cylinder block 12 forward relative to the engine E, whereas the electric motor M is disposed behind the cylinder block 12 of the engine E on the opposite side of the exhaust pipe 22. So, the electric motor M is less susceptible to heat radiation from the exhaust pipe 22. In addition, the exhaust pipe 22 extends through a region below the crankcase 15, whereas the electric motor M is disposed above the crankcase 15. So, the electric motor M is less susceptible to heat radiation from the exhaust pipe 22. Thus, the electric motor M is not substantially affected by disturbances such as heat. As a result, stable operation of the electric motor M can be achieved.

Furthermore, since the electric motor M is disposed in the space formed behind the cylinder block 12 and above the crankcase 15 in the engine E in which the cylinder block 12 and the crankcase 15 form the substantially L-shape in the side view, space efficiency improves, and increase in the size of the vehicle body can be suppressed.

The electric motor M is disposed forward relative to the connecting point A where the front portion of the swing arm 11 is coupled to the pivot frame member 10, and behind the cylinder block 12 of the engine E so that the heavy weight of the electric motor M is mounted at a location near the center of gravity of the motorcycle 1. As a result, stability of the motorcycle 1 is improved.

As shown in FIG. 2, the first electric power supplying unit 42 for supplying the electric power to the starter motor 41 is charged with the electric power from the second electric power supplying unit 34 for supplying the electric power to the electric motor M. This eliminates a need for an electric generator for charging the first electric power supplying unit 42. As a result, increase in the size of the vehicle body can be further suppressed.

As shown in FIGS. 4 and 5, since the electric motor M is fixedly mounted to the engine E side, a distance between the output shaft Mc of the electric motor M and the crankshaft 16 is constant regardless of occurrence of great vibration through the vehicle body. As a result, the silent chain 33 operates stably as compared to the construction in which the electric motor M is fixedly mounted to the vehicle body frame side.

Whereas the bracket 45 for mounting the electric motor M is mounted between the electric motor M and the engine E separately from the electric motor M and the engine E, it may alternatively be integral with an outer wall of the engine E. In further alternative, the electric motor M may be mounted to the vehicle frame side instead of the engine E side. Whereas batteries for converting electric energy to chemical energy through a chemical reaction and accumulating the chemical energy therein are used as the first electric power supplying unit 41 and the second electric power supplying unit 34 in this embodiment, capacitors or the like for accumulating electricity as electric charges may be used. Any other electric power accumulating devices may be used so long as they can accumulate and supply the electric power. Whereas the DC/DC converter 43 is disposed between the first electric power supplying unit 42 and the second electric power supplying unit 34 in this embodiment, it may be omitted if the first electric power supplying unit 42 can be charged with the electric power from the second electric power supplying unit 34 without a need for the DC/DC converter. Moreover, the number of cylinders equipped in the motorcycle of the present invention is not intended to be limited.

As this invention may be embodied in several forms without departing from the spirit of essential characteristics thereof, the present embodiments are therefore illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

What is claimed is:

1. A motorcycle in which an engine is disposed between a front wheel and a rear wheel and an exhaust pipe for guiding an exhaust gas emitted from the engine is extended forward relative to the engine, the motorcycle comprising:
    an electric motor that is configured to apply a torque to a crankshaft of the engine;
    wherein the engine includes a cylinder block that extends substantially vertically and a crankcase that extends substantially horizontally rearward from a lower portion of the cylinder block, and the cylinder block and the crankcase form a substantially L-shape in a side view;

wherein the exhaust pipe is extended rearward from a region forward of the cylinder block through a region below the crankcase;

wherein a frame member is extended rearward from a head pipe for supporting the front wheel, a swing arm extending substantially forward and rearward is pivoted at a front portion thereof to the frame member, and the rear wheel is rotatably mounted to a rear portion of the swing arm;

wherein the electric motor is disposed forward relative to a connecting point where the swing arm and the frame member are coupled to each other, and is disposed in a space formed behind the cylinder block and above the crankcase; and wherein the electric motor is fastened to the engine, and torque from the electric motor is transmitted to the crankshaft.

2. The motorcycle according to claim 1, further comprising:

a starter motor configured to apply a torque to the crankshaft to start the engine;

a first electric power supplying unit configured to supply an electric power to the starter motor; and a second electric power supplying unit configured to supply the electric power to the electric motor and to have a voltage higher than a voltage of the first electric power supplying unit;

wherein the first electric power supplying unit is configured to be able to be charged with the electric power supplied from the second electric power supplying unit.

3. The motorcycle according to claim 1, wherein the electric motor is positioned below a connecting point where an intake port of the engine and a throttle device are coupled to each other.

4. The motorcycle according to claim 1, wherein a bracket is mounted to a left side surface of the crankcase so as to protrude to a left end surface of the electric motor, and the bracket is fastened to the left end surface of the electric motor by a bolt.

5. The motorcycle according to claim 4, wherein the bracket is a metal plate.

6. The motorcycle according to claim 4, wherein a penetrating hole into which the output shaft of the electric motor is inserted and a penetrating hole into which the crankshaft is inserted are formed on the bracket.

7. The motorcycle according to claim 4, wherein a first sprocket mounted on a left end portion of the output shaft and a second sprocket mounted on a left end portion of the crankshaft are disposed on a left side of the bracket.

8. The motorcycle according to claim 7, wherein a cover in which the first sprocket, the second sprocket and a chain wound around the first sprocket and the second sprocket are accommodated is mounted on a left side surface of the bracket.

9. The motorcycle according to claim 8, wherein the cover, the bracket and the crankcase are fastened to each other by a bolt, and the cover, the bracket and the electric motor are fastened to each other by a bolt.

10. The motorcycle according to claim 1, wherein the electric motor is fastened to an upper surface of a rear portion of the crankcase by a bolt and is fastened to a back surface of the cylinder block by a bolt.

* * * * *